June 5, 1962 J. W. FUNDERBURG 3,037,340
COTTON PICKER SPINDLE
Filed Sept. 19, 1960
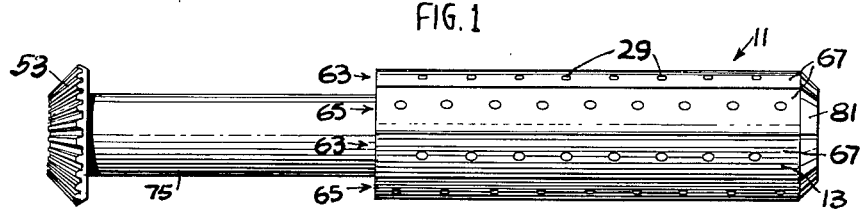
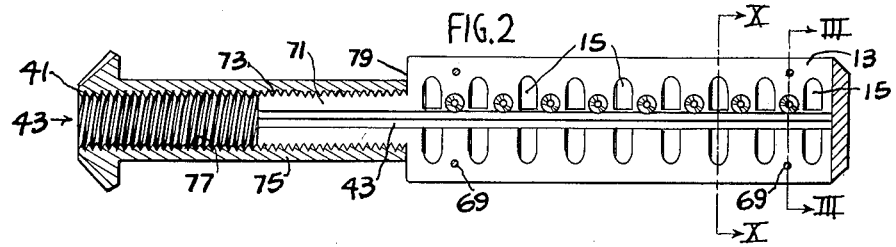
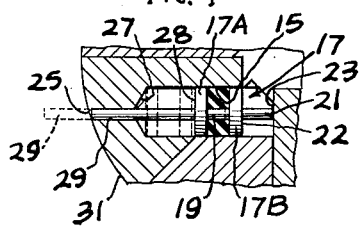
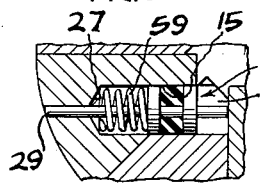
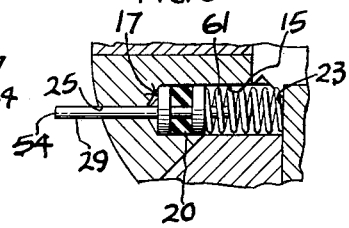
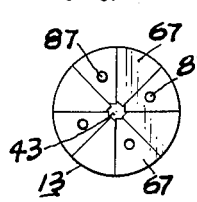
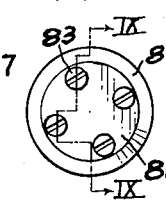
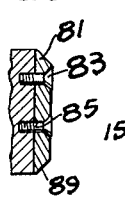
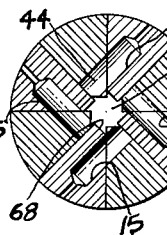
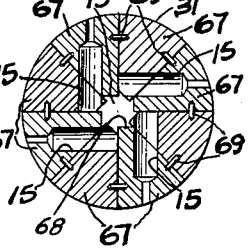
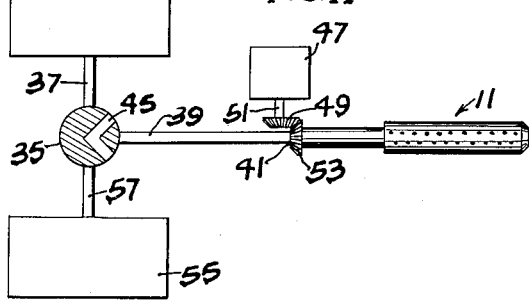
INVENTOR.
JOHN W. FUNDERBURG
BY John R. Walker, III
Attorney United States Patent Office 3,037,340
Patented June 5, 1962

3,037,340
COTTON PICKER SPINDLE
John W. Funderburg, 2136 Big Bend, Memphis 14, Tenn.
Filed Sept. 19, 1960, Ser. No. 56,776
10 Claims. (Cl. 56—50)

This invention relates to a cotton picker spindle adapted to be used in mechanical cotton pickers of well-known types which have means for rotating the spindles as the spindles are moved through the rows of cotton, as for example, the type shown in Patent No. 2,224,286.

In most well-known cotton pickers of the above mentioned type, which have smooth, rod-like spindles, water is applied to the spindles so that the cotton will adhere better thereto. This water causes certain disadvantages including a lowering of the grade of the cotton. Previous attempts have been made to eliminate the water by providing teeth or the like on the spindle, but this has its disadvantages since the doffing of the cotton from the spindles is made more difficult.

The present invention is directed toward solving the above mentioned and other problems by eliminating the need of water and yet providing a spindle from which the cotton may be easily removed.

Therefore, one of the objects of the present invention is to provide a spindle which is adapted to give a better grade of picked cotton, since there is no water to mix with the foreign matter to give stains.

A further object is to provide such a cotton picking spindle which include a plurality of fingers that extend outwardly from the body of the spindle to engage the cotton and facilitate the picking thereof.

A further object is to provide such a spindle which is adapted to pick more cotton than conventional spindles, since the fingers stick out farther and have a greater pull in getting the cotton from the burr.

A further object is to provide such fingers at an angle relative to the body of the spindle, whereby a hooking effect is produced which facilitates the picking of the cotton.

A further object is to provide such a spindle in which the fingers thereof are retractable to leave a substantially smooth spindle body from which the cotton may be easily removed.

A further object is to provide such a spindle which is larger in diameter than conventional spindles so that the cotton will not be folded around the spindle as closely and it will not be necessary to twist and knot the cotton to get it out of the burr.

A further object is generally to improve the design and construction of cotton picking spindles.

The means by which the foregoing and other objects of the present invention are accomplished and the manner of their accomplishment will be readily understood from the following specification upon reference to the accompanying drawings, in which:

FIG. 1 is a side elevational view of the cotton picker spindle of the present invention with the fingers being shown in a retracted position.

FIG. 2 is a longitudinal sectional view taken as on a vertical plane through the longitudinal center line of the spindle of FIG. 1, with the fingers and related parts being removed for the purpose of clarity.

FIG. 3 is an enlarged sectional view taken as on the line III—III of FIG. 2.

FIG. 4 is a further enlarged fragmentary view of a portion of the device shown in FIG. 3 and showing in elevation and in solid lines a picking finger and its related parts in a retracted position, and showing, in broken lines, the extended position of the finger and its related parts.

FIG. 5 is a view similar to FIG. 4 of an alternate embodiment of the present invention with the picking finger shown in a retracted position.

FIG. 6 is a view similar to FIG. 4 of another alternate embodiment of the present invention with the picking finger shown in the extended position.

FIG. 7 is an end view of the device of FIG. 1 with the end cap thereof removed.

FIG. 8 is an end view of the same but with the cap shown in place.

FIG. 9 is a sectional view taken as on the line IX—IX of FIG. 8.

FIG. 10 is an enlarged sectional view taken as on the line X—X of FIG. 2.

FIG. 11 is a schematic view showing an arrangement for extending and retracting the fingers in the cotton picker spindle of the present invention.

Referring now to the drawings in which the various parts are indicated by numerals, the spindle of the present invention, which is indicated in general as at 11, includes an elongated cylindrical body 13 having a plurality of cylinders 15 provided therein. In each of cylinders 15 is slidably fitted a piston 17 which is preferably separated in two parts, 17A and 17B, spaced apart and rigidly interconnected by a rod 19 adjacent the central portions thereof. An O-ring 20, formed of rubber or other suitable packing material, is fitted on rod 19 and sealingly engages the walls of cylinder 15. A projection 21 is fixedly attached to the inner end 22 of piston 17 and extends inwardly therefrom to limit inward movement of the piston when the projection strikes the end wall 23 of cylinder 15. A reduced bore 25 is provided in body 13 adjacent each cylinder and extends outwardly from the outer end of the cylinder to the exterior of body 13. Bore 25 preferably extends from the center portion of the substantially cone-shaped outer wall 27 of cylinder 15 so that the longitudinal axes of bore 25 and cylinder 15 are in alignment.

Adjacent the central portion of the outer end 28 of each of pistons 17 is fixedly attached an elongated rod-like finger 29 which extends outwardly from the piston and slidably through reduced bore 25. Means is provided for urging each of pistons 17 simultaneously outwardly in cylinders 15 to carry the fingers 29 outwardly into an extended position, as shown in dotted lines in FIG. 4, wherein it will be seen that the finger extends outwardly beyond the exterior 31 of body 13 for a portion. This means for extending the finger 29 preferably includes a source of fluid pressure, indicated diagrammatically as at 33 in FIG. 11, which fluid is preferably air, although hydraulic fluid or the like may be used without departing from the spirit and scope of the present invention. Fluid pressure source 33 is carried by the cotton picker, not shown, and communicated to a valve 35 by a line 37. Valve 35 has leading therefrom a line 39 which contacts the inner end 41 of the spindle and is in communication with a central elongated passage 43 which extends from the inner end 41 along the length of the body 13 and is in communication with the inner end 44 of each of cylinders 15.

When it is desired to place spindle 11 in a condition for picking cotton, at the proper time, any suitable means, not shown, actuates valve 35 so that the passage 45 of the valve communicates line 37 with line 39 to apply pressure to the inner ends 22 of pistons 17 and move fingers 29 to said extended position. In addition, suitable means provided on the cotton picker, not shown, rotates spindles 11 clockwise, as viewed in FIGS. 3 and 10. Thus, this rotating means is illustrated diagrammatically as at 47 in FIG. 11 and includes a gear 49 rotatably driven by a shaft 51. Gear 49 meshes with a gear 53 provided on the inner end 41 of the spindle 11 to rotate the spindle in a well-known manner. Although the spindle of the present invention is more suited for use with a so-called drum type of cotton picker, it is not to be so limited since it may be adapted to use with other types of cotton pickers without departing from the spirit and scope of the present invention.

Means communicating with pistons 17 are provided for moving the pistons inwardly to carry fingers 29 into said retracted disposition in which the distal ends 54 of each of the fingers are substantially flush with the exterior 31 and confined completely within the body 13, as shown by the solid lines in FIG. 4. The means for moving pistons 17 inwardly preferably include a vacuum source carried by the cotton picker and indicated diagrammatically as at 55 in FIG. 11. Vacuum source 55 is communicated with valve 35 by a line 57. When it is desired to place spindle 11 in a condition to facilitate the removal or doffing of cotton therefrom, at the proper time valve 35 is adapted to be turned by any suitable means, not shown, so that the passage 45 communicates line 57 with line 39 and a vacuum is applied to the inner ends 44 of cylinders 15 to cause the pistons 17 to move inwardly to said retracted position.

An alternate way in which to accomplish the above results is by omitting either the pressure source 33 or vacuum source 55 and substituting therefor spring pressure on pistons 17. Thus, for example, with the embodiment shown in FIG. 5 the vacuum source 55 is omitted and a spring 59 extends between the forward end of piston 17 and the outer wall 27 in circling relationship relative to the portion of finger 29 in cylinder 15, so that when it is desired to retract fingers 29 the pressure is removed from pistons 17 and the spring 59 urges the pistons to said retracted position.

In FIG. 6 a spring 61 is illustrated between the inner end of piston 17 and the end wall 23, in which case the pressure source 33 is omitted and when the vacuum is removed from the inner end of the piston the spring 61 urges the piston outwardly to move the finger 29 into said extended position.

Fingers 29 are preferably arranged in eight longitudinal rows circumferentially spaced around spindle 11 with adjacent rows being staggered and with every other row being in transverse alignment. Thus, the fingers 29 of longitudinal rows 63 are in transverse alignment around the spindle and are staggered relative to the rows 65 therebetween. In other words, there are four rows 63 and four alternate rows 65, and the rows 63 are spaced 45 degrees from the adjacent rows 65. When viewed through a transverse section of the spindle 11, diagonally opposite fingers 29 and, thus, the related diagonally opposite cylinders 15 are parallel, and adjacent fingers and, thus, the related adjacent cylinders are perpendicular. In addition, the cylinders 15 and fingers 29 are offset relative to the center of body 13. This can best be seen in FIG. 3, which shows one cylinder 15 of each of the four rows 63, and FIG. 10, which shows one of each of the cylinders 15 of rows 65. By the cylinders 15 and fingers 29 being offset, it will be understood that fingers 29, when extended, project outwardly from exterior 31 at an angle inclined towards the direction of rotation of spindle 11 to establish a hooking effect that facilitates picking of the cotton. In other words, each finger 29 is not normal to exterior 31, but is at an angle relative to a radius of spindle 11 extending through the center of the outer end of the related reduced bore 25.

The actual construction of spindle 11 is preferably from eight forty-five degree sections 67, each of which represents substantially one-eighth of a cylinder. Adjacent sections 67 are held by pins 69 extending into aligned bores in the adjacent sections. In building the device, the sections 67 are first joined together in pairs, and the cylinders 15 and bores 25 are drilled. It will be noted that the cylinders 15 extend through portions of two sections 67. Also, the tip of the acute angle portion of each of sections 67 is preferably removed at this time to leave a flat tip or end 68 so that when assembly is completed there will be a passage 43. End 68 is preferably disposed perpendicular to one of the sides of sections 67, which makes passage 43 irregularly-shaped but which causes substantially the same opening from passage 43 to cylinders 15.

After the sections are assembled in pairs and drilled, as above described, two pairs are assembled together to form one-half of a cylinder and the other two pairs are assembled to form the other half. Then, these two halves are brought together and held in alignment by pins 69. Next, one end of the above mentioned assembly is turned down on a lathe or the like to form the reduced shank 71, which is also provided with exterior threads 73. The next step in the assembly is to threadedly engage a sleeve 75, which is provided with internal threads 77, onto shank 71 and rotate the sleeve until the end thereof engages the end wall 79 of the larger part of body 13. The end of sleeve 75 opposite from end wall 79 is the place upon which gear 53, heretofore described, is formed. It will be understood from the foregoing that the sections 67 are now held together by sleeve 75. The opposite end of the sections 67 are held together by a cap 81 which is attached to the end of spindle 11 by means of screws 83 extending through apertures 85 provided in cap 81 and which screws extend into threaded sockets 87 provided in alternate ones of sections 67. It is preferable to provide the sockets 87 in the sections which contain rows 63 since the cylinders 15 adjacent the outer end of the body 13 are farther from the outer end than the cylinders in the rows 65 so that there is no danger of interference between the sockets 87 and the cylinders. Also, it should be noted that screws 83 are preferably countersunk so that the outer end of the spindle 11 is smooth. Also, cap 81 is preferably tapered around the edge thereof, as at 89.

From the foregoing it will be understood that a very unique and effective means is provided for picking cotton, which is more efficient than heretofore known types of means for picking cotton, and which produces a better grade of cotton. In addition, there is no necessity for water and the cotton is easily removed from the spindles.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. In a cotton picker, a cotton picking spindle comprising a body, a plurality of pistons each having an outer end and an inner end, said body being provided with a plurality of cylinders therein respectively slidably receiving said pistons, said body additionally being provided with a plurality of bores therein respectively leading from said cylinders to the exterior of said body, a plurality of fingers respectively slidably mounted in said bores and respectively attached to said pistons adjacent the outer ends thereof and adapted to be moved therewith between a retracted position in said body and an extended position extending outwardly from the exterior of said body, means operatively associated with each of said pistons adjacent the inner ends thereof for urging said pistons outwardly to carry said fingers into said extended position during cotton picking, and means operatively associated with each of said pistons adjacent the outer ends thereof for urging said pistons inwardly to carry said fingers into said retracted position during cotton doffing.

2. In a cotton picker, a cotton picking spindle comprising a substantially cylindrical body, means rotating said spindle, a plurality of pistons each having an outer end and an inner end, said body being provided with a plurality of cylinders therein respectively slidably receiving said pistons, said body additionally being provided with a plurality of bores therein respectively leading from said cylinders to the exterior of said body, a plurality of fingers respectively slidably mounted in said bores and respectively attached to said pistons adjacent the outer ends thereof and adapted to be moved therewith between a retracted position in said body and an extended position extending outwardly from the exterior of said body, said cylinders being offset relative to the center of said body in such a manner that said fingers when extended project outwardly from the exterior of said body at an angle inclined towards the direction of rotation of said spindle whereby a hooking effect is provided to facilitate picking of the cotton, means operatively associated with each of said pistons adjacent the inner ends thereof for urging said pistons outwardly to carry said fingers into said extended position during cotton picking, and means operatively associated with each of said pistons adjacent the outer ends thereof for urging said pistons inwardly to carry said fingers into said retracted position during cotton doffing.

3. The device of claim 1 in which one of said means includes fluid under pressure and the other of said means includes a vacuum.

4. The device of claim 1 in which one of said means includes fluid under pressure and the other of said means includes resilient means.

5. The device of claim 1 in which one of said means includes a vacuum and the other of said means includes resilient means.

6. The device of claim 2 in which said body comprises a plurality of sections of a cylinder fitted together, pin means holding said sections in alignment, said sections being reduced in diameter adjacent one end thereof and being externally threaded, an internally threaded sleeve engaged over said externally threaded portion of said sections to hold said sections together adjacent said one end, and an end plate fixedly mounted adjacent the opposite end of said body from said one end to hold said sections together adjacent said opposite end.

7. The device of claim 6 in which one of said means includes fluid under pressure and the other of said means includes a vacuum.

8. The device of claim 6 in which one of said means includes fluid under pressure and the other of said means includes resilient means.

9. The device of claim 6 in which one of said means includes a vacuum and the other of said means includes resilient means.

10. A cotton picking spindle for cotton pickers, comprising a body provided with a plurality of bores therein extending inwardly into said body from the exterior of said body, a plurality of fingers respectively slidably mounted in said bores with each of said fingers being movable in a straight endwise path between a retracted position and an extended position relative to its related bore, when in said retracted position each of said fingers being disposed substantially entirely within its related bore, and when in said extended position each of said fingers extending outwardly from the exterior of said body, and piston means in said body attached to each of said fingers for selectively moving each of said fingers into said retracted position and said extended position.

References Cited in the file of this patent
UNITED STATES PATENTS

| | | |
|---|---|---|
| 457,743 | Lispenard | Aug. 11, 1891 |
| 1,059,478 | Lispenard | Apr. 22, 1913 |
| 1,447,328 | Rycroft | Mar. 6, 1923 |
| 2,493,564 | Arneson | Jan. 3, 1950 |
| 2,811,820 | McClure | Nov. 5, 1957 |